United States Patent [19]

Diehr, II et al.

[11] 4,344,142

[45] Aug. 10, 1982

[54] DIRECT DIGITAL CONTROL OF RUBBER MOLDING PRESSES

[75] Inventors: James R. Diehr, II, Troy; Theodore A. Lutton, Birmingham, both of Mich.

[73] Assignee: Federal-Mogul Corporation, Southfield, Mich.

[21] Appl. No.: 602,463

[22] Filed: Aug. 6, 1975

Related U.S. Application Data

[63] Continuation of Ser. No. 472,595, May 23, 1974, abandoned, which is a continuation-in-part of Ser. No. 401,127, Sep. 26, 1973, abandoned.

[51] Int. Cl.³ .......................... G06F 15/46; B29H 5/02
[52] U.S. Cl. .................................... 364/473; 264/40.1; 264/325; 364/476; 425/144; 425/156; 374/53; 374/102
[58] Field of Search .................. 235/151, 151.1, 150.1; 494/1; 264/40, 315, 347, 297, 326, 236, 325; 425/135, 143, 144, 149, 150, DIG. 44, 29, 32, 38, 162, 165, 155, 169, 170

[56] References Cited

U.S. PATENT DOCUMENTS

| | | | |
|---|---|---|---|
| 3,579,626 | 5/1971 | Brittain | 264/315 X |
| 3,649,729 | 3/1972 | Davis et al. | 264/40 |
| 3,659,974 | 5/1972 | Neugroschl | 264/40 X |
| 3,718,721 | 2/1973 | Gould et al. | 264/40 |
| 3,819,915 | 6/1974 | Smith | 235/151 X |
| 3,980,743 | 9/1976 | Smith | 264/40.2 |

Primary Examiner—Joseph F. Ruggiero
Attorney, Agent, or Firm—Owen, Wickersham & Erickson

[57] ABSTRACT

Rubber-molding presses, which are closed manually upon installation of pieces of rubber compound, are opened automatically by a system which continuously calculates and recalculates the correct cure time and is actuated when the calculated cure time equals the elapsed cure time. An interval timer starts running from the time of mold closure, and the temperature within the mold cavity is measured often, typically every ten seconds. The temperature is fed to a computer which also is given access to the time-temperature cure data for the compound being molded, and the computer calculates and recalculates every time the data as to temperature is presented, until the total picture of time and temperature presents to the computer the time at which the material is fully cured. Then the computer signals for automatic opening of the mold press. Many presses can be controlled by a single computer, which still operates to recalculate the data about every ten seconds, and the time-temperature cure data for the compound can also be modified by information from a rheometer.

11 Claims, 4 Drawing Figures

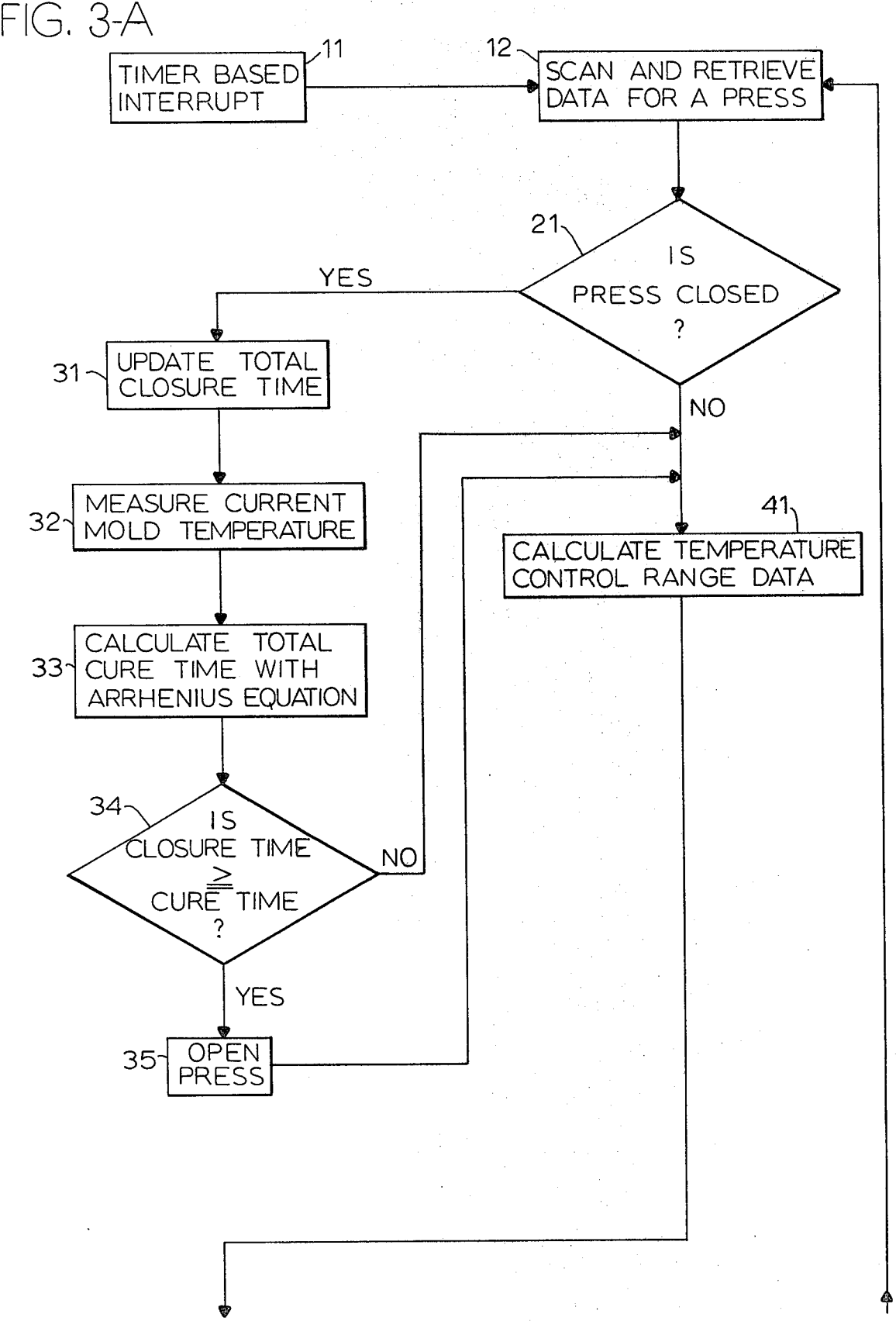
FIG. 3-A

FIG. 3-B
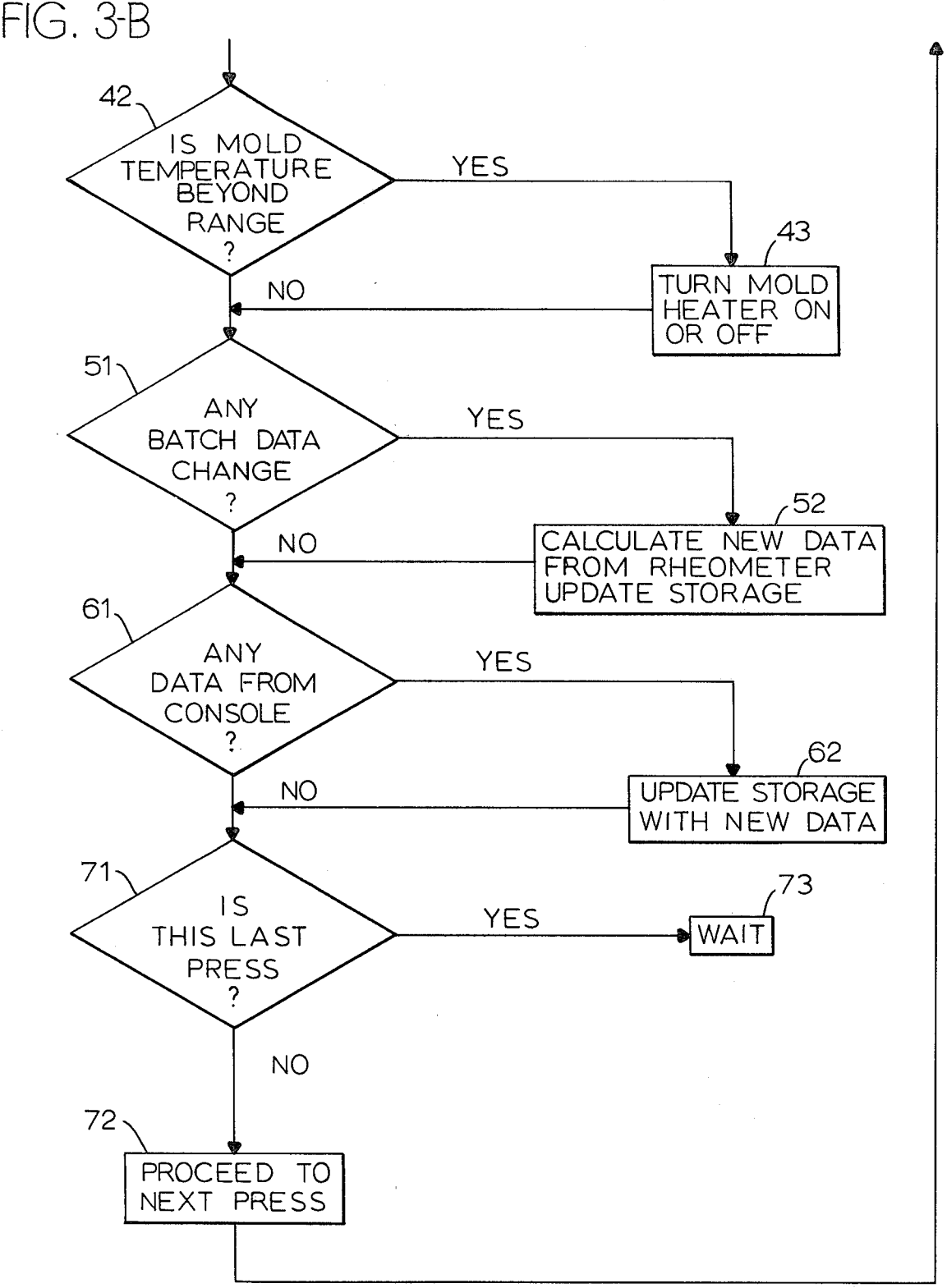

DIRECT DIGITAL CONTROL OF RUBBER MOLDING PRESSES

CROSS REFERENCE TO RELATED APPLICATION

This is a continuation of application Ser. No. 472,595, filed May 23, 1974, now abandoned, which was a continuation-in-part of application Ser. No. 401,127, filed Sept. 26, 1973, now abandoned.

BACKGROUND OF THE INVENTION

This invention relates to accurate and automatic control of the molding time for rubber compounds and the automatic opening of rubber-molding presses when the cure is calculated to be complete.

Much time-temperature cure data for rubber compounds is known, and each manufacturer of rubber products usually has some of these data at his disposal. The usual way of operating rubber-molding presses is for the operator to load them manually and for the operator then to close the press. Closure of the press operates a timer which has been preset for a time at which cure should be completed in view of what is supposed to be the temperature of the mold. However, the mold temperature, even though it is thermostatically maintained, is not likely to be identical with this supposed temperature. The actual temperature of the mold may vary rather widely, and the correction of the temperature by the thermostat may take some time. For example, the amount of time that the press is open during the operator's loading of the press varies, and the longer the press is open, the cooler the mold is when it is closed and again starts heating. Thus, it may be many degrees below its nominal temperature when the mold is first closed, and it may take a substantial amount of time for the mold to reach this nominal temperature. The thermostats are usually actuated within a plus or minus 2% to cause the device to heat until it reaches the nominal temperature, but this is not sufficient to assure that the temperature has been maintained as an average during the entire molding operation—as a matter of fact, it rarely if ever has.

Because of these inaccuracies, the practice in the industry has been to calculate the cure time as the shortest time in which one can be absolutely certain that all parts will be cured with any reasonable amount of mold-opening time during unloading of the previous batch and reloading. This, of course, means that the rubber will tend to be overcured in almost every instance, because the worst cure time will not be so often met with. It also means that if there are times in which the mold is opened longer than was thought or in which the mold temperature for some other reason did not rise in time, that even the nominally worst time will not be so bad that some batches will be undercured.

This practice has had two serious economical effects: in the first place, many batches have to be discarded when after tests they are found either to be undercured or overcured beyond the tolerance limits. This has been a serious problem in many factories where synthetic rubber has been cured. In the second place, it means that the molds are kept occupied and are closed much longer than they need to be to obtain the best results. This means that fewer products can be molded per unit time and per hour of operator work. As a result, there has been substantially less production than would have been possible had the actual cure time been known and followed by the mold.

It is an object of the present invention to achieve more exact cure of the rubber material being molded so as to substantially reduce the number of defectively cured batches that have to be rejected. Another object is to reduce substantially the amount of time in which the presses are closed unnecessarily. By accurate and constant calculation and recalculation of the correct mold time under the temperatures actually present in the mold, the material can be cured accurately and can be relied upon to produce very few rejections, perhaps completely eliminating all rejections due to faulty mold cure. Furthermore, the mold and the operator can be much more efficiently employed.

SUMMARY OF THE INVENTION

The invention uses computers of well-known type with data storage banks containing the time-temperature cure data for the compound or compounds being used; in some cases, the stored data includes additional cure data, such as variations in batch characteristics. A surveillance system is maintained over the mold to determine the actual mold temperature substantially continuously, for example, every ten seconds, and to feed that information to the computer along with the pertinent stored data and along with the elapsed time information. The computer then continually recalculates on the basis of the temperature changes, and the elapsed time, and the time-temperature cure data, and arrives every ten seconds at a new time-temperature cure curve for that particular batch then being cured which the computer compares with the elapsed time every second; then, when the calculated cure time equals the elapsed cure time, the computer signals the opening of the mold to an electromechanical device which immediately opens the mold.

Modern computers act so rapidly that these recalculations are no burden and can easily be done each second. In fact, a computer can work much faster than that, so that a series of molds can be monitored in the same way with perhaps 50 or 60 molds being watched, and every ten seconds the actual temperature for each mold involved can be fed to the computer, which calculates with the time-temperature data available the correct cure for each and every mold and opens each one separately.

Moreover, further accuracy can be obtained by supplying the computer with rheometer data for each batch of the molding compound so that the computer has even more accurate information that will affect the time-temperature cure data.

Other objects and advantages of the invention will appear from the following description of a preferred embodiment.

BRIEF DESCRIPTION OF THE DRAWINGS

In the drawings:

FIG. 3 is a program flow chart for the method illustrated in the flow sheet of FIG. 2.

FIG. 3 is shown on two sheets as FIGS. 3A and 3B.

DESCRIPTION OF SOME PREFERRED EMBODIMENTS

A simple case involving a single mold

The invention will probably best be understood by first describing a simple example, in which a single mold is involved and in which the information is relatively static.

The invention is applicable to a wide range of synthetic elastomers being cured and to their being molded for many uses. Much of the data verifying the invention has been obtained in the manufacture and cure of synthetic elastomer radial shaft seals. Butyl rubbers, acrylic rubbers and others have been concerned. The tests have shown that the method works on all of them.

Figure 1:
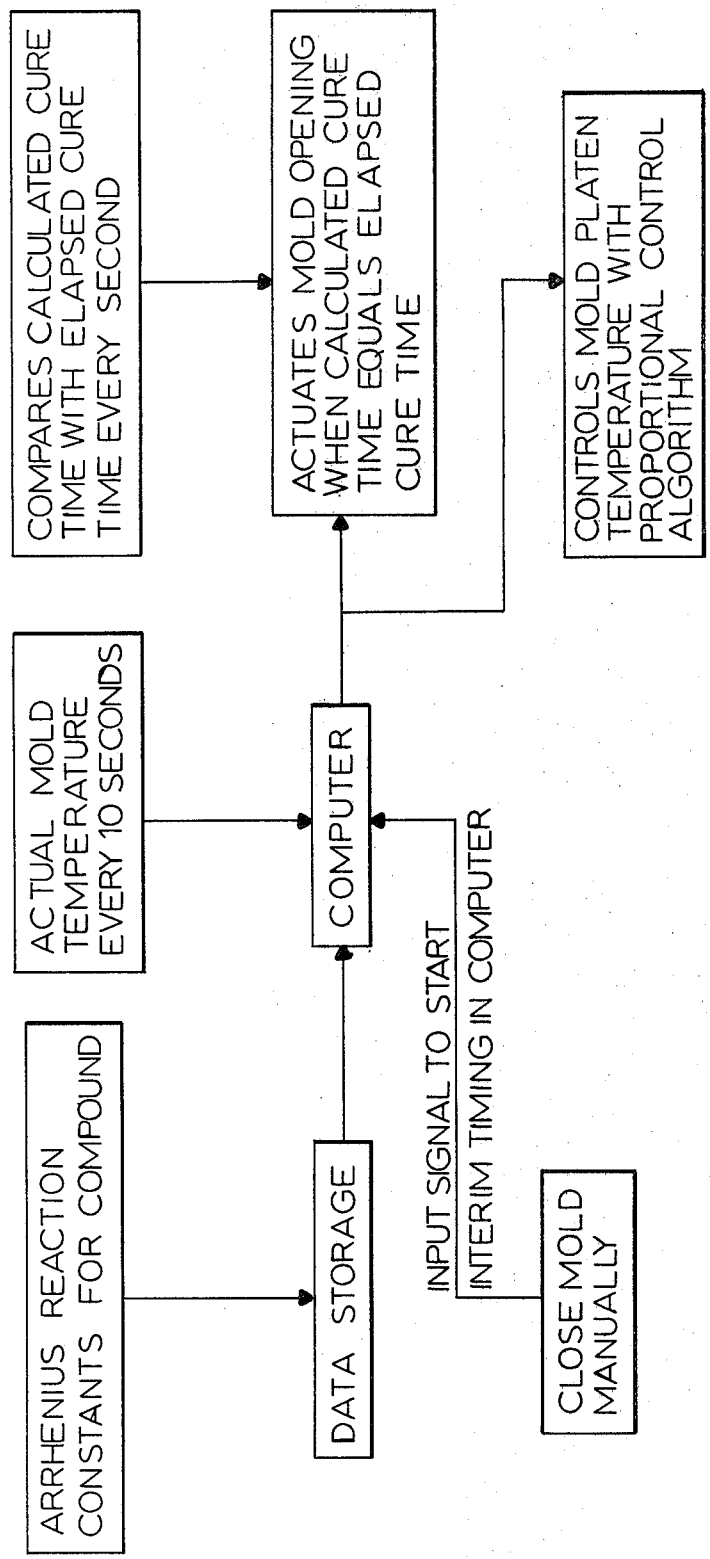
FIG. 1 is a flow sheet for a simple system for controlling a single mold and a single compound and illustrating the principles of the invention.

A standard digital computer may be employed in this method. It has a data storage bank of suitable size which, of course, may vary when many molds are used and when more refinements are employed. However, FIG. 1 shows a relatively simple case which achieves results that are vast improvements over what has been done up to now. Thus, in the manufacture of synthetic elastomer oil seals, some actual data showed that about 12.2% of time could be saved by using this invention; in other words, the molds could be in use for 12.2% more time than they had been theretofore. These data also showed that the percent rejects could be reduced by about 45% in this particular plant.

The data bank of the computer is provided with a digital input into which the time-temperature cure data for the compound involved is fed, as shown in FIG. 1. All the data is available to the computer upon call, and the call can be automatic depending upon the temperature actually involved. In other words, the computer over and over questions the data storage, asking, what is the proper time of cure for the following summation of temperatures? The question may be asked each second, and the answer is readily provided.

The mold is closed manually, as in the present practice, since this is the best way to assure that everything has been placed properly into the mold. The operator, however, has no other duties than to remove the cured articles from the mold, to put in the "prep" or blanks which are to be molded and cured, to make sure that every cavity is properly filled, and then to close the mold. He does not have to concern himself about the temperatures or cure time, because all that is taken care of automatically.

Once the mold has been closed manually, it initiates a timer in the computer, via a digital signal, which feeds the elapsed time of mold closure to the computer constantly or in a digital fashion. Thus, once each each calculation cycle, e.g., once each second the computer can be aware of the amount of time involved, and this can be made even more frequent if that is desired. A point of difference from the prior art, however, is that the timer itself does not directly actuate the opening of the mold, and the mold time is not a set time.

The actual mold temperature is fed to the computer on a substantially continuous basis, for example, every ten seconds. Thermocouples, or other temperature-detecting devices, located directly within the mold cavity may read the temperature at the surface where the molding compound touches the mold, so that it actually gets the temperature of the material at that surface. The computer then performs series of integrations to calculate from the series of temperature readings and from the time-temperature cure data a proper cure time and to compare that cure time with the elapsed time. Recalculation continues until the time that has elapsed since mold closure corresponds with the calculated time. Then, the computer actuates the mold-opening device and the mold is automatically opened.

Once again, it should be stressed that the computer is not simply working on one time-temperature curve, it is working on a whole series of them, so that the proper compensation is made for the changes of temperature that occur within the mold. This makes it possible to get a substantially exact cure time. Therefore, when the cure is calculated as complete it will be complete.

Figure 2:
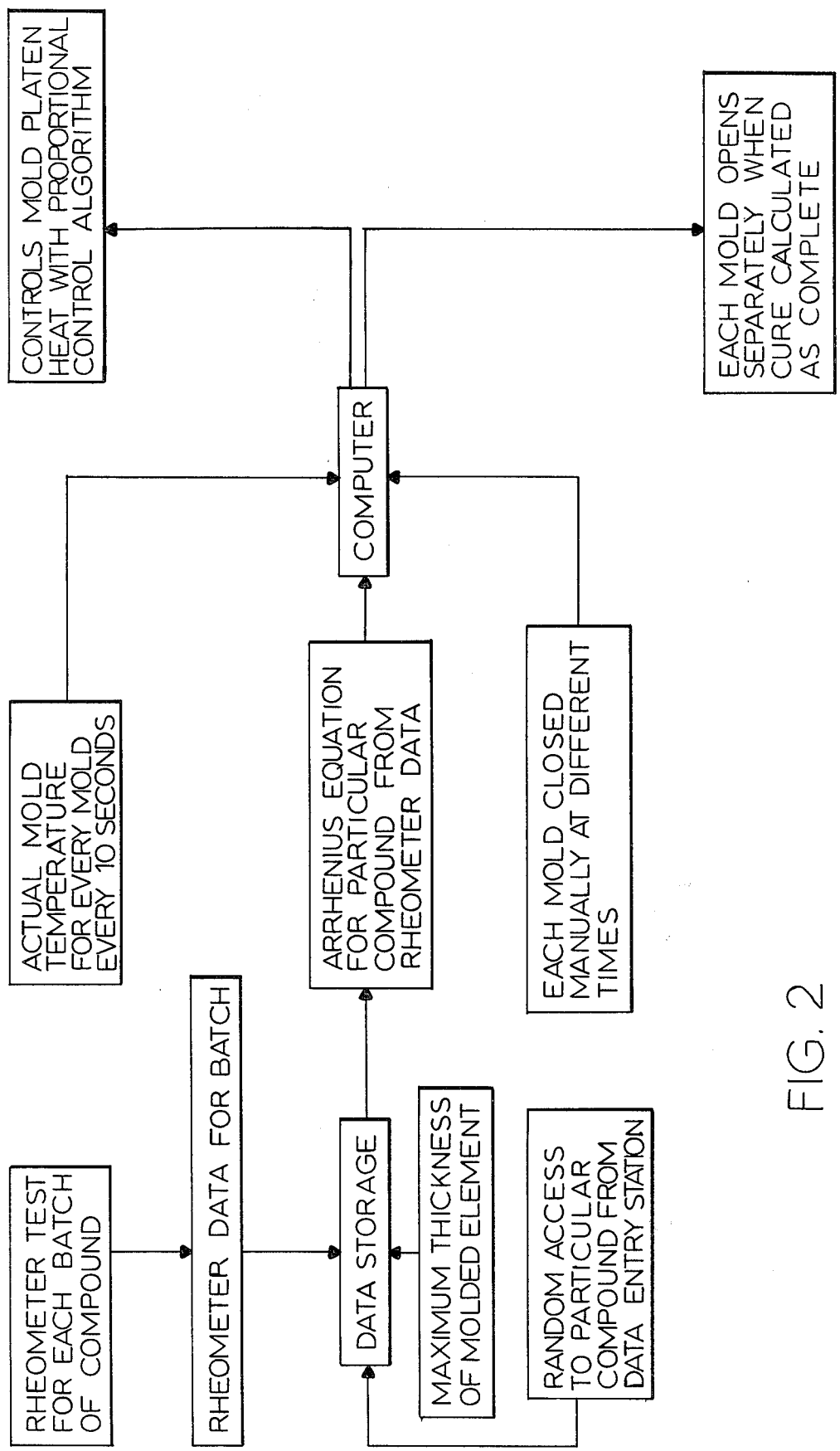
FIG. 2 is a flow sheet for a more complex system in which many molds are controlled by the same computer and in which a rheometer test is made for each batch of compound.

A more complex system-FIG. 2

The relatively simple system of FIG. 1 is easily expanded within the capability of many present-day computers. For example, the computer can be used to operate a whole series of molds—50 or 60 molds—each one of them receiving the attention of the computer, e.g. once a second, at which time the elapsed cure time and the calculated cure time are checked for equality.

Data storage can be expanded by including in the data storage bank the time-temperature cure data for all compounds and for past batches of various compounds. Random access enables the data for any particular compound to be made available to the computer upon request, which the computer makes when it is told what compound is being used.

Furthermore, the rheometer test can be made for each batch of the compound to determine the minimum torque and maximum torque as well as intermediate torque levels and temperature, all of which are used to determine cure time in accordance with the Arrhenius equation as explained hereinbelow. This means that each batch can be differentiated and corrections made on the basis of data in the data storage bank which the computer has access to, so that the rheometer data for the batch are fed into the computer each time a new batch is being used in the system. Thus the constant C referred to below is determined for each particular batch of compound being cured. It can even be used for different batches used in different parts of the same plant, that is, in different molds; the computer can take care of that, too, all within well-known capabilities.

Another factor which affects the time and temperature of curing is that of the mold geometry, and particularly the maximum thickness of the element to be molded. This factor is set out as constant x referred to hereinbelow, and for each mold and compound such data is fed into the computer to enable the computer to calculate the Arrhenius equation. The rule here is that the thickest part of the molded compound has to be completely cured. Knowing the thickest part and the dimensions of it, the results can be much more accurate than otherwise.

Thus, in the system of FIG. 2, each time a mold is closed, even though it is a different time from the closure of every other mold, it starts an elapsed timing situation within the computer per the time-temperature curve and in accordance with the actual mold temperature for each mold. With this information and the other information already mentioned, the computer continuously, for example, every ten seconds, recalculates the proper time-temperature cure and arrives at the cure time, as before stated. When this cure time for the integrated series equals the elapsed time, then each mold is separately opened at its proper elapsed time on the signal from the computer.

FIG. 3 shows a computer program flow chart for the system illustrated in FIG. 2. In FIG. 3 the computer function steps are indicated within rectangles, whereas the logic steps or questions are shown within diamond-shaped parallelograms. A timer-based interrupt 11 initiates the program one every second. Upon program initiation, the computer scans and retrieves from data storage within the computer certain operating data for the first press in the sequence of presses controlled by the computer. This function step, indicated by reference numeral 12, makes available data concerning the press mold configuration constant, the activation energy constant for the material being cured, the mold temperature set point, the constant of proportionality required to determine a temperature control range, and the total elapsed time, if any, that the press has been closed up to the instant of this step. Having available the foregoing information, the computer reaches a logic decision 21, whether the press is closed. If the press is not closed, i.e., the press is open, the program sequences directly to a calculation 41 of temperature control range data, to be subsequently discussed. If the press is closed, a program subroutine to control cure time is followed.

In this subroutine, the computer first updates at 31 the amount of time that this particular press has been closed. Next, the current mold temperature is measured at 32 by thermocouple or other heat sensing means within the mold and the measurement is converted to digital information and read by the computer. The total elapsed closure time and the current temperature, along with the data previously retrieved from data storage are then used by the computer at 33 to calculate the total press closure cure time as a function of the Arrhenius equation:

$$\ln v = C Z + x$$

In this equation:
ln is the symbol for natural logarithm,
v is the total required cure time and end point for press closure.
C is the activation energy constant, a unique figure for each batch of each compound being molded, determined in accordance with the present invention by rheometer measurements of the batch,
Z is the present mold temperature at 32, and
x is a constant dependent upon the geometry of the particular mold of the press.

This Arrhenius equation is numerically solved as follows:

$$v = e^{(cz+x)}$$
$$= 1 + \frac{(cz + x)}{1!} + \frac{(cz + x)^2}{2!} + \frac{(cz + x)^3}{3!}$$

Once a value for v, the end point time has been calculated, the computer determines at 34 whether the total elapsed time as updated at 31 is equal to or greater than the calculated end point time. If the updated time at 31 equals or exceeds the calculated end point time at 33, then a control signal is generated at 35 to open the press automatically, thereby completing one scan of the press closure control subroutine. If this time has not yet been reached, the subroutine is for the moment completed and the program continues, but the subroutine will be repeated later, usually about once per second.

Whether the full cure time has not been reached or whether it has, the next step is the calculation at 41 of mold temperature control range data. This step may be performed as a subroutine in each scan of the press, or preferably, it may be performed with every tenth scan, or once every ten seconds. The calculation of the mold and temperature control range data is accomplished pursuant to the following Algorithm:

Heater on/off state = Signum $|e(t) \cdot K|$ wherein
e(t) is the difference between the mold temperature set point and the present mold temperature and
K is a constant of proportionality set to provide the desired proportional control of the heater.

The computer next determines at 42 whether the mold heater current temperature is beyond the calculated temperature control range. If the current temperature is too high, a signal is generated at 43 to turn the mold heater off. Likewise, if the current mold temperature is too low, a control signal is generated at 43 to turn the mold heaters on. In this manner, the computer maintains close control over actual mold temperature to maintain it within a range of temperatures closely approaching and equalling the set point temperature.

The program next causes the computer to ascertain at 51 whether any change in batch data from the rheometer connected to the computer is awaiting transfer to storage. If new batch data are awaiting transfer to data storage update, the computer passes these update data at 62 to the correct storage address within the computer.

From time to time, new data concerning press mold configuration, batch characteristics, and other system parameters are entered manually by the computer control operator through a control console. Thus, on each program cycle, the computer determines at 61 whether any new data concerning the press are awaiting entry from the console. In the event of new console data, the computer then acts at 62 to transfer the data to the correct storage address within the computer data storage.

Finally, the program asks the computer to determine at 71 whether the press being controlled at the moment is the last press in the total program control sequence. If the press is the last one, the computer waits at 73 for the next program control sequence to be initiated by the timer-based interrupt 11. In other words, the presses are open for product delivery and reloading. However, if another press is to be scanned and controlled within the present program control sequence, the computer proceeds at 72 to act for all such presses and repeats the above-described program routine for those presses, commencing with step 12. With the speed and capacity of presently available computers it is possible to scan and control as many as sixty different presses within the one-second total program control sequence.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method of operating a rubber-molding press for precision molded compounds with the aid of a digital computer, comprising:
    providing said computer with a data base for said press including at least,
    natural logarithm conversion data (ln),
    the activation energy constant (C) unique to each batch of said compound being molded, and
    a constant (x) dependent upon the geometry of the particular mold of the press,
    initiating an interval timer in said computer upon the closure of the press for monitoring the elapsed time of said closure,
    constantly determining the temperature (Z) of the mold at a location closely adjacent to the mold cavity in the press during molding,
    constantly providing the computer with the temperature (Z),
    repetitively performing in the computer, at frequent intervals during each cure, integrations to calculate from the series of temperature determinations the Arrhenius equation for reaction time during the cure, which is $$\ln v = CZ + x$$

where v is the total required cure time,
    repetitively comparing in the computer at frequent intervals during the cure each said calculation of the total required cure time calculated with the Arrhenius equation and said elapsed time, and
    opening the press automatically when a said comparison indicates completion of curing.

2. The method of claim 1 including measuring the activation energy constant for the compound being molded in the press with a rheometer and automatically updating said data base within the computer in the event of changes in the compound being molded in said press as measured by said rheometer.

3. The method of claim 1 including providing the computer with a mold temperature set point for each mold and a constant of proportionality with which a range of permissible mold temperature variation may be calculated, calculating at frequent periodic intervals in the computer the range of mold temperature variations from the set point, comparing at frequent periodic intervals in the computer the range of mold temperatures and the actual temperature, and controlling the mold heater to keep the mold temperature within the calculated range of the set point.

4. The method of claim 3 wherein the frequent periodic interval is approximately 10 seconds.

5. A method of operating a plurality of rubber-molding presses simultaneously curing precision molded compounds in conjunction with a computer, comprising:
    providing said computer with a data base for each said press including at least,
    natural logarithm conversion data (ln),
    the activation energy constant (C) unique to each batch of said compound being molded, and
    a constant (x) dependent upon the geometry of the particular mold of the said press,
    constantly informing the computer of the temperature (Z) of each mold,
    informing the computer of the batch of the compound being molded in each mold,
    constantly informing the computer of the elapsed time that the compound has been in each mold,
    repetitively performing for each said press at frequent periodic intervals during each curve in the computer, integrations to calculate from the series of temperature determinations the Arrhenius equation to determine the total required cure time, which is $\ln v = CZ + x$, where v is the total required cure time,
    repetitively comparing at frequent periodic intervals in the computer the calculated total required cure time and the elapsed time for each said press, and
    opening each said press automatically when its elapsed time has reached its calculated total required cure time.

6. The method of claim 1 wherein each said frequent interval is no longer than approximately one second.

7. A method of manufacturing precision molded articles from selected synthetic rubber compounds with the aid of a digital computer, comprising:
    providing said computer with a data base for a molding press to be used in the molding, including at least,
    natural logarithm conversion data (ln),
    the activation energy constant (C) unique to each batch of said compound being molded, and
    a constant (X) dependent upon the geometry of the particular mold of the press,
    installing prepared unmolded synthetic rubber of one said compound in a molding press cavity,
    closing said press,
    initiating an interval timer associated with said computer upon the closure of the press for monitoring the elapsed time of said closure,
    constantly determining the temperature (Z) of the mold at a location closely adjacent to the mold cavity in the press during molding,
    constantly providing the computer with the temperature (Z),
    repetitively performing in the computer, at frequent intervals during each cure, integrations to calculate from the series of temperature determinations the Arrhenius equation for reaction time during the cure, which is $$\ln v = CZ + x$$

where v is the total required cure time,
    repetitively comparing in the computer at frequent intervals during the cure each said calculation of the total required cure time calculated with the Arrhenius equation and said elapsed time,
    opening the press automatically when a said comparison indicates completion of curing, and
    removing the resulting precision molded article from the press.

8. The method of claim 7 including measuring the activation energy constant for the compound being molded in the press with a rheometer and automatically updating said data base within the computer in the event of changes in the compound being molded in said press as measured by said rheometer.

9. The method of claim 7 including in addition,
    providing the computer with a mold temperature set point for each mold and a constant of proportionality with which a range of permissible mold temperature variation may be calculated, calculating at frequent periodic intervals in the computer said range of permissible mold temperature variations, comparing at frequent periodic intervals in the computer said calculated range of permissible mold temperature, variation and the actual temperature (Z) in the press, and controlling the mold heater from said computer to keep the mold temperature (Z) within said calculated range of the set point.

10. The method of claim 9 wherein the frequent periodic interval is approximately 10 seconds.

11. A method of manufacturing precision molded articles from selected synthetic rubber compounds in an openable rubber molding press having at least one heated precision mold, comprising:

(a) heating said mold to a temperature range approximating a predetermined rubber curing temperature, (b) installing prepared unmolded synthetic rubber of a known compound in a molding cavity of a predetermined geometry as defined by said mold, (c) closing said press to mold said rubber to occupy said cavity in conformance with the contour of said mold and to cure said rubber by transfer of heat thereto from said mold, (d) initiating an interval timer upon the closure of said press for monitoring the elapsed time of said closure, (e) heating said mold during said closure to maintain the temperature thereof within said range approximating said rubber curing temperature, (f) constantly determining the temperature (Z) of said mold at a location closely adjacent said cavity thereof throughout closure of said press, (g) repetitively performing at frequent periodic intervals throughout closure of said press integrations to calculate from the series of temperature determinations the Arrhenius equation for reaction time of said rubber to determine total required cure time v as follows:

$$\ln v = cz + x$$

wherein c is an activation energy constant determined for said rubber being molded and cured in said press, and x is a constant which is a function of said predetermined geometry of said mold, (h) for each repetition of calculation of said Arrhenius equation herein, comparing the resultant calculated total required cure time with the monitored elapsed time measured by said interval timer, (i) opening said press when a said comparison of calculated total required cure time and monitored elapsed time indicates completion of curing, and (j) removing from said mold the resultant precision molded and cured rubber article.

* * * * *